United States Patent [19]

Fauvel

[11] Patent Number: 5,129,306
[45] Date of Patent: Jul. 14, 1992

[54] BREAKABLE JOINT SYSTEM ENABLING PARTS TO BE SEPARATED BY MEANS OF AN EXPLOSIVE CHARGE

[75] Inventor: Gilbert Fauvel, Juziers, France

[73] Assignee: Aerospatiale Societe Nationale Industrielle, Paris, France

[21] Appl. No.: 747,650

[22] Filed: Aug. 20, 1991

[30] Foreign Application Priority Data

Aug. 20, 1990 [FR] France ............... 90 10472

[51] Int. Cl.⁵ .................................. F42B 15/38
[52] U.S. Cl. ........................ 89/1.14; 102/378
[58] Field of Search ............ 89/1.14; 102/378; 60/632, 636

[56] References Cited

U.S. PATENT DOCUMENTS

| | | | |
|---|---|---|---|
| 3,032,356 | 5/1962 | Botsford | 285/3 |
| 3,087,369 | 4/1963 | Butterfield | 89/1.14 |
| 3,230,885 | 1/1966 | Weber et al. | 89/1.14 |
| 3,362,290 | 1/1968 | Carr et al. | 89/1.14 |
| 3,903,803 | 9/1975 | Losey | 89/1.14 |
| 4,648,227 | 3/1987 | Reusch | 102/378 |
| 4,685,376 | 8/1987 | Noel et al. | 89/1.14 |

FOREIGN PATENT DOCUMENTS

| | | |
|---|---|---|
| 0273061 | 7/1988 | European Pat. Off. |
| 0246958 | 11/1987 | France. |
| 2638228 | 4/1990 | France. |
| 2224338 | 5/1990 | United Kingdom. |

*Primary Examiner*—David H. Brown
*Attorney, Agent, or Firm*—Fisher, Christen & Sabol

[57] ABSTRACT

A breakable joint system for enabling parts to be separated, in particular the top structures of a space vehicle, the system being of the type comprising two plates which mechanically interconnect said parts and which have an explosive charge disposed therebetween, e.g. an explosive fuse cord. The two plates are juxtaposed against each other in a join plane, defining between them a housing for receiving said explosive charge. The end faces of said parts have recesses in which the respective corresponding ends of said juxtaposed plates engage. Fixing means fix the ends of said plates in the recesses of said parts.

9 Claims, 4 Drawing Sheets

BREAKABLE JOINT SYSTEM ENABLING PARTS TO BE SEPARATED BY MEANS OF AN EXPLOSIVE CHARGE

The present invention relates to a breakable joint system enabling parts to be separated by means of an explosive charge such as a length of fuse cord.

FIELD OF THE INVENTION

The system of the invention is designed particularly, but not exclusively, for application in the aviation and space industries to enable certain parts to be separated from aircraft or from launchers. For example, such systems may interconnect the various parts of the top structure of a launcher (i.e. the nose cone containing a satellite) for the purpose of separating said parts when the fuses are caused to explode.

BACKGROUND OF THE INVENTION

Until now, such parts which form the outer shell of a satellite-support structure of a space launcher in the above-mentioned example, are made and then stored separately prior to being assembled together by means of breakable joint systems. Thus, because of the large sizes of such parts (which may, in some cases, reach several meters in diameter) or because of their complex shapes, systems are designed for being fitted thereto.

To assemble together two parts that are designed subsequently to be separated from each other, conventional breakable joint systems comprise two frames each having a fork or clevis shape at one end for receiving the corresponding edge of one of the parts, which edge is held therein by glue and/or by bolts passing radially through the final assembly. The system further includes interconnection plates enabling the facing opposite ends of the frames to be assembled together by means of bolts, which plates are disposed to overlie each other on opposite sides of said ends of the frames. The explosive fuse cord is inserted in conventional manner in an expansible tube in order to avoid subsequent pollution of space, and it is housed in a fuse-receiving housing delimited by the overlying interconnection plates and by the corresponding ends of the frames which penetrate between said plates. Zones of weakness are provided on said plates so that when the fuse is caused to explode, the expansible tube breaks the plates in said zones, thereby separating the two parts.

Although it operates satisfactorily, this type of breakable joint system nevertheless suffers from drawbacks, in particular because its very structure requires said explosive fuse and said plates to be assembled to said frames as individual parts which means that installing the plates and the explosive fuse on said frames is lengthly and difficult. In addition, by using said frames, such a conventional joint system presents significant mass and bulk. Since the safety requirements in the intended fields of application are extremely severe, it is not easy to reduce the mass of the system. Further, the design of such a prior art system gives rise to an embodiment which is clearly symmetrical such that the explosive fuse is disposed in the transverse midplane of the plates at equal distances from the connections between the plates and the frames, and this does not optimize the breaking force delivered by the fuse.

An object of the present invention is to mitigate these drawbacks and to provide a breakable joint system enabling parts, in particular the top structures of a space launcher, to be separated by means of an explosive charge, the design of the system being simple and making it easy to assemble the system on said parts while reducing the mass of the system and optimizing the breaking force produced by the explosive charge.

SUMMARY OF THE INVENTION

To this end, the present invention provides a breakable joint system for enabling parts to be separated, in particular the top structures of a space vehicle, the system being of the type comprising two plates which mechanically interconnect said parts and which have an explosive charge disposed therebetween, e.g. an explosive fuse cord, wherein: the two plates are juxtaposed against each other in a join plane, defining between them a housing for receiving said explosive charge; the end faces of said parts have recesses in which the respective corresponding ends of said juxtaposed plates engage; and fixing means fix the ends of said plates in the recesses of said parts.

Thus, the breakable joint system of the invention is easily installed. The two plates and the explosive fuse can be assembled together prior to being fixed on said parts (with such prior assembly possibly merely comprising placing the plates against each other along their join plane with the explosive fuse being inserted between them), thereby constituting a subsystem which is in turn fixed as a whole to said parts. The invention thus ensures that the plates and the explosive fuse are no longer installed individually on said parts. In addition, the invention also makes it possible to omit frames initially mounted on said parts, thereby considerably reducing the mass and the bulk of the system. Further, whereas for the reasons given above, earlier designs have always sought to provide systems suitable for fitting to the parts by means of the frames without requiring the parts themselves to be acted on for, by having recesses formed in the corresponding end faces of said parts, the system of the invention makes it possible to assemble said subsystem directly on said parts.

The parts used in space technology are often composite, i.e. they have two strong skins, e.g. based on carbon fibers, and between the skins there is a core, e.g. of the honeycomb type. The system of the invention is particularly suitable for use with such parts.

Under such circumstances, the ends of said juxtaposed plates are engaged in recesses in said parts, said recesses being defined during manufacture of said parts by leaving gaps in the peripheral edge of said core, where they are set back relative to the respective peripheries of the strong skins. It is thus particularly easy to design these recesses during the manufacture of said parts. It may also be observed that in this case, said plates enable forces to be transmitted from one part to another via the skins of said parts.

According to another feature of the invention, said housing receiving the explosive charge is offset relative to the transverse midplane of said juxtaposed plates, perpendicular to the join plane, thereby being close to one of said ends of said plates. In this way, when the explosive charge is fired to separate the parts, it produces breakage by shear, with the maximum amount of energy being used for breaking said plates, and not for twisting them.

To further facilitate breakage of the plates and separation of the parts, notches are provided in the walls of the plates that delimit the housing for receiving the explosive charge, thereby creating local zones of weakness in said plates. Advantageously, said notches formed in the walls of the plates that delimit the housing for receiving said charge are disposed in the vicinity of said explosive charge in those portions of the walls that are furthest from the transverse midplane of the plates.

According to yet another feature of the system, a cavity is also formed in said juxtaposed plates in the vicinity of said join plane, said cavity being disposed parallel to said housing for receiving the explosive charge so as to be close to the other of said ends of said plates.

This cavity serves firstly to further reduce the mass of the plates while retaining their mechanical strength, and secondly to create zones of weakness in said plates at the edges of said skins of the corresponding part, such that when the explosive charge is fired, the plates twist easily about these zones of weakness and a maximum amount of energy is made available for breaking said plates.

When the system of the invention is designed to separate two parts along a circular line, it may comprise a plurality of pairs of plates each comprising a juxtaposed outer plate and inner plate, said pair of plates constituting a portion of a ring and said pairs of plates being disposed either adjacent to one another or spaced apart from one another.

BRIEF DESCRIPTION OF THE DRAWINGS

An embodiment of the invention is described by way of example with reference to the accompanying drawings, in which.

In the figures, identical references designate items that are similar.

DETAILED DESCRIPTION

Figure 1:
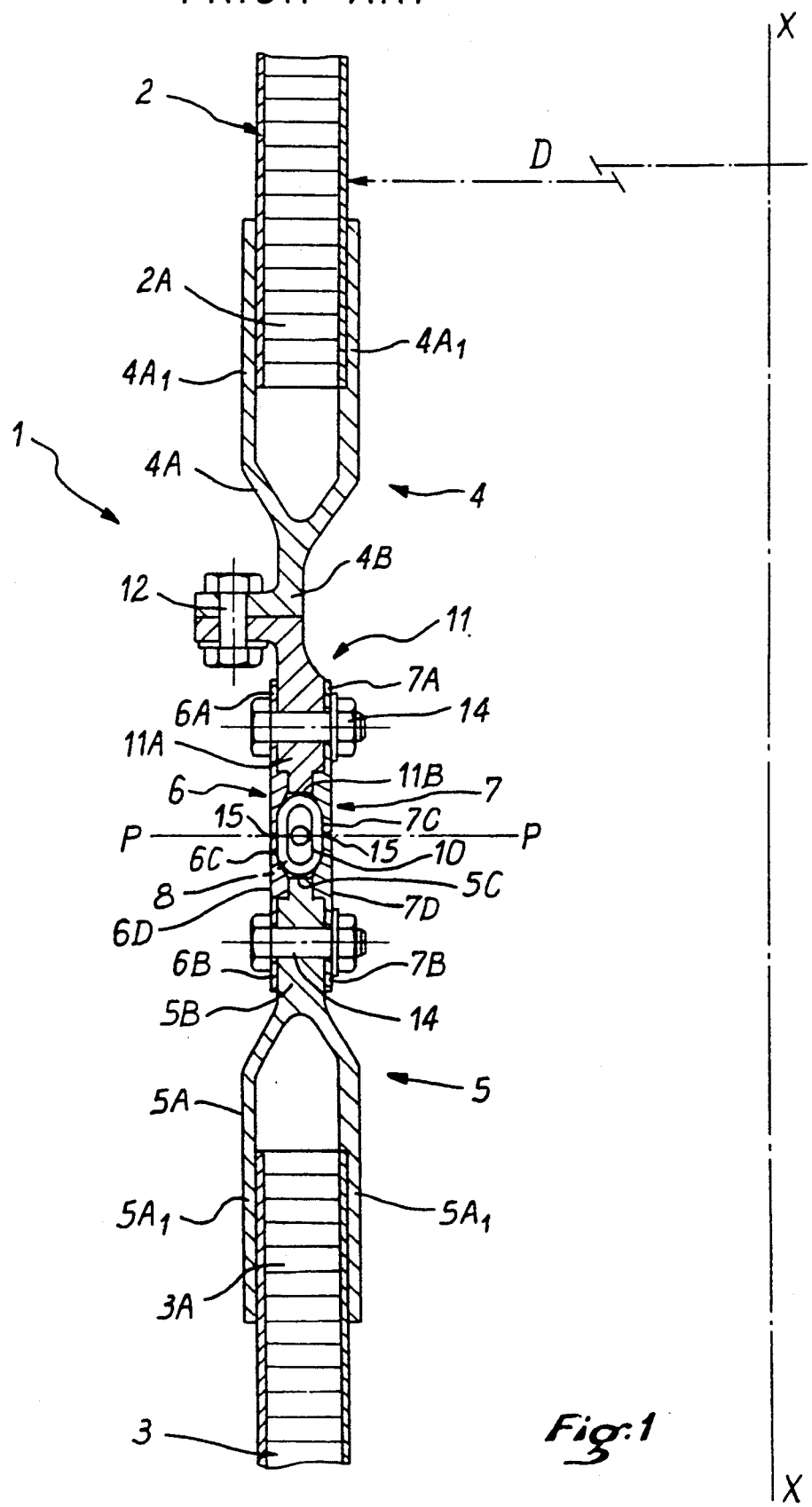
FIG. 1 is a half view in longitudinal section through two circularly symmetrical parts of a space launcher, which parts are interconnected by a prior art breakable joint system, and are designed to be separated from each other by said system.

The prior art breakable joint system 1 shown in FIG. 1 is designed to separate two parts 2 and 3 such as the cylindrical outer shells of two stages of the structure at the top of a space launcher, for example. The longitudinal axis X—X of the launcher is shown, and the diameter D of the parts may be several meters.

The system 1 comprises two cylindrical frames 4 and 5 each of which is terminated at one end by a U-shaped clevis respectively referenced 4A or 5A. Thus, the end 2A of cylindrical part 2 is engaged between the arms 4A₁ of clevis 4A while the end 3A of cylindrical part 3 is engaged between the arms 5A₁ of clevis 5A. The clevises on the frames are assembled to the ends of the parts in conventional manner by gluing, and optionally by bolts (not shown) passing radially through the joints.

The system 1 also includes two plates 6 and 7 in the form of cylindrical sectors and serving firstly to interconnect the two frames 4 and 5, and secondly to define an internal housing 8 which receives the explosive charge such as an explosive fuse cord 10 disposed inside an expansible tube.

In this example of the prior art, the system 1 includes an intermediate cylindrical frame 11 for disassembly purposes and fixed to the end 4B of the frame 4 by means of bolts 12. Consequently, the cylindrical plates 6 and 7 interconnect the intermediate frame 11 and the frame 5. To do this, the ends 6A and 6B of the outer circular plate 6 relative to the longitudinal axis X—X, and the ends 7A and 7B of the inner circular plate 7 bear respectively against opposite sides of the ends 11A and 5B of said frames by overlying them, with the plates being identical in profile. The plates are fixed to the frames by radial bolts 14.

The cylindrical housing 8 of approximately oblong section that receives the explosive fuse 10 is situated in the transverse midplane P—P of the plates and it is delimited by the facing faces 6C and 7C of the plates and by the facing edges 11B and 5C of the frames. Consequently the intermediate frame 11 allows the system to be disassembled without requiring it to be taken apart completely. Further, notches 15 are also provided in the transverse midplane of the plates on the outside faces 6D and 7D of the plates so as to facilitate breakage of the plates when the explosive fuse is fired, thereby causing the cylindrical parts 2 and 3 to be separated.

Thus, the design of conventional systems 1 requires the plates and the explosive fuse to be mounted individually on said parts, gives rise to considerable mass, to large bulk, and to a symmetrical configuration that does not optimize the breaking force delivered by the explosive fuse against the plates 6 and 7.

Figure 2:
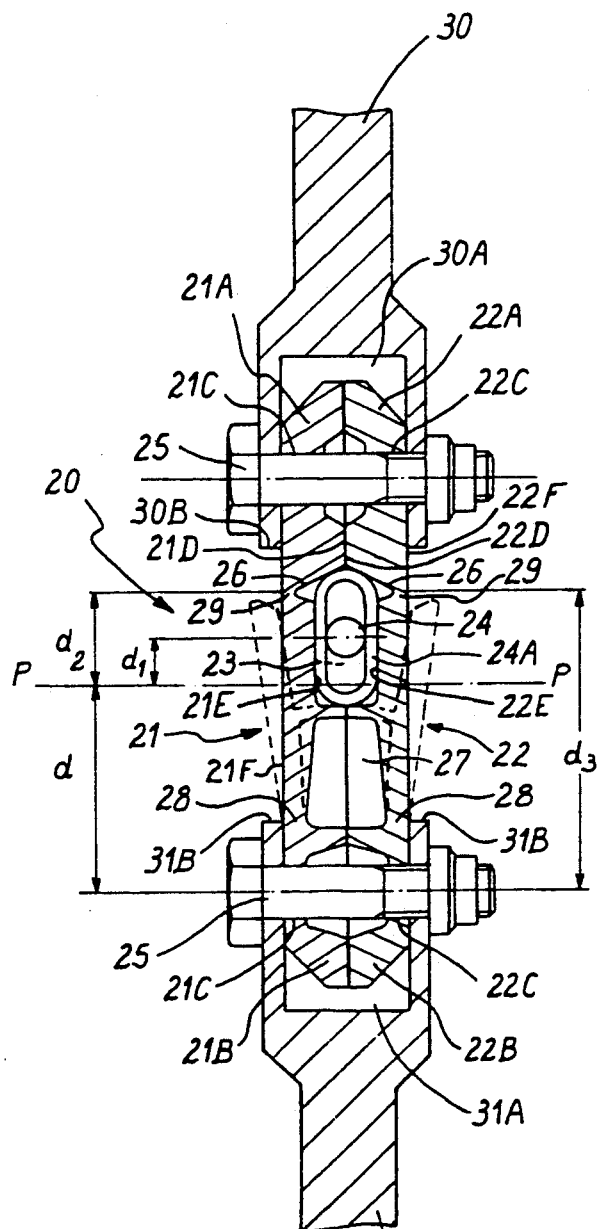
FIG. 2 shows in section a breakable joint system of the invention for separating two parts of a space launcher.
Figure 4:
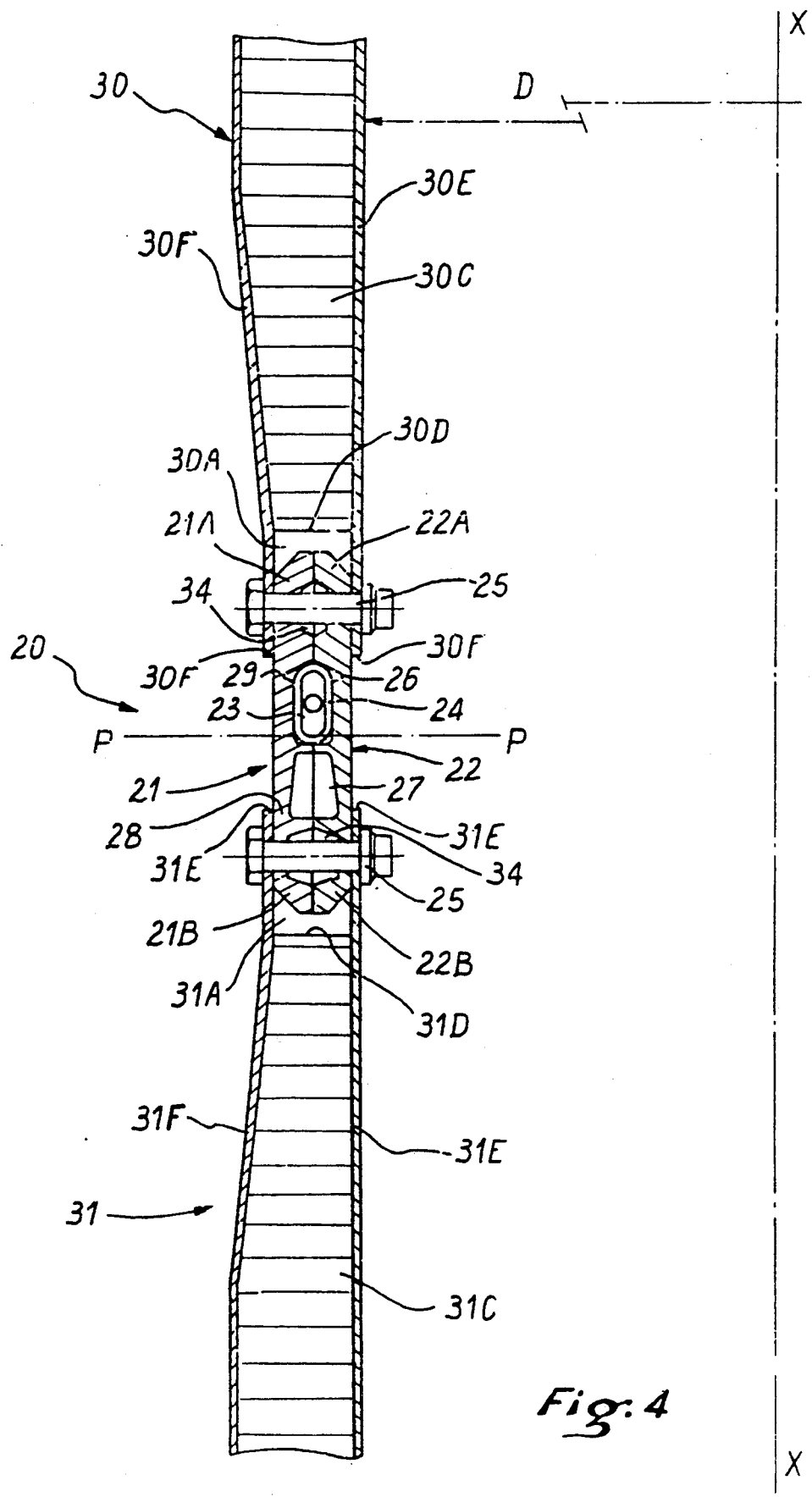
FIG. 4 shows an advantageous application of the breakable joint system of the invention to composite type parts.

These drawbacks are obviated by the breakable joint system 20 of the invention as shown in FIGS. 2 and 4.

With reference to FIG. 2, this embodiment of the invention comprises an outer plate 21 and an inner plate 22 which are concentric about the longitudinal axis X—X, which plates are juxtaposed against each other on a join plane and define between them a housing 23 for receiving the explosive charge such as an explosive fuse 24. The touching ends 21A & 22A and 21B & 22B of the plates engage directly in recesses 30A and 31A formed respectively in the end faces 30B and 31B of the circularly symmetrical parts 30 and 31. These circular recesses present channel sections.

The juxtaposed plates are held in the recesses of the parts by bolts 25 which pass radially through orifices 21C and 22C provided in corresponding positions in the ends of the plates.

In addition, the housing 23 is formed in the inside faces 21D and 22D that come into contact with each other to form the join plane of the plates 21 and 22, with the explosive fuse 24 of substantially oblong section being disposed against the walls 21E and 22E of the housing 23. The fuse includes an expansible tube 24A for preventing pollution of space in conventional manner when the fuse is fired. Advantageously, the housing 23 is offset relative to the transverse midplane P—P of the plates 21 and 22 and perpendicular to the join plane so as to be closer to the touching ends 21A and 22A of said plates.

Figure 3:
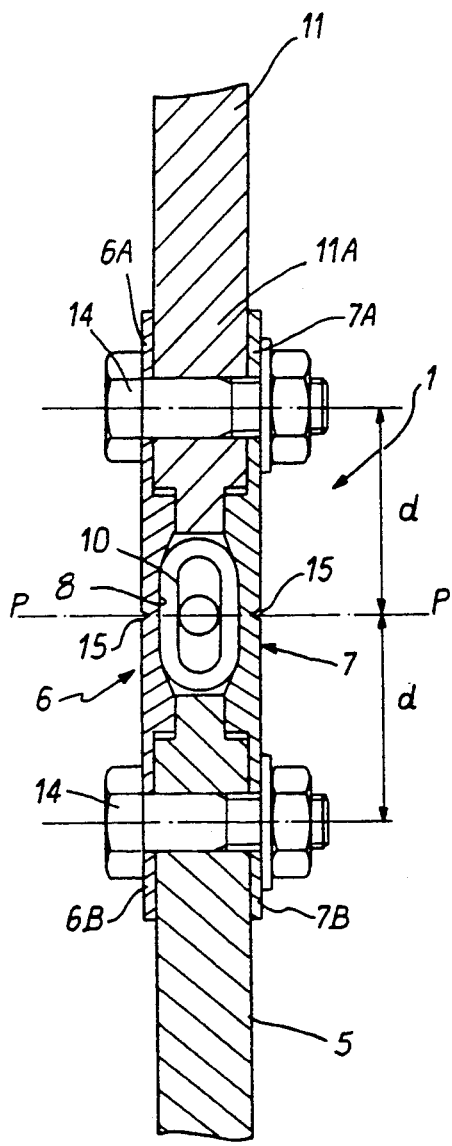
FIG. 3 is a view on a larger scale of the prior art joint system shown in FIG. 1.

In order to illustrate the importance of the fuse 24 disposed in the housing 23 being offset and the additional effects that result therefrom, FIG. 3 shows a portion of the prior art system shown in FIG. 1 but drawn adjacent to FIG. 2 which shows the invention, and drawn to the same scale.

FIG. 3 shows the plates 6 and 7 with the explosive fuse 10 disposed inside the housing 8 and lying on the transverse midplane P—P. The plates 6 and 7 are connected by the bolts 14 to the frames 11 and 5 which are themselves fixed to respective ones of the parts. In FIG. 3, the distances d between the axis of the fuse 10 contained in the plane P—P and the axes of the bolts 14 are equal, and as a result the fuse breaks the plates by applying traction to them.

In contrast, as can be seen in FIG. 2, since the housing 23 is offset, the axis of the explosive fuse 24 lies at a distance d1 from the transverse midplane P—P at the distance d from the axes of the bolts 25. As a result, the force produced by the fuse on each plate causes it to break in shear. In addition, to optimize breakage, notches 26 are provided in the walls 21E and 22E of the inside faces 21D and 22D delimiting the housing 23, thereby creating local zones of weakness 29 delimited between the notches 26 and the outside faces 21F and 22F of the plates. The notches 26 are advantageously situated in the portion of the housing wall that is furthest from the transverse midplane P—P, and at a distance d2 therefrom, adjacent to said expansible tube 24A.

Thus, the breaking effect due to the explosive fuse is further increased by the lever arm d3 established in this way which corresponds to the sum of the distances d+d2 between the notches 26 and the bolt 25 which connects the part 31 to the plates 21 and 22.

In addition, a cavity 27 is also formed in the inside faces 21D and 22D forming the join plane of the juxtaposed plates. The section of this cavity 27 is substantially trapezium-shaped and it is disposed parallel to the housing 23 so as to be close to the ends 21B and 22B of the plates. Thus, in addition to reducing the mass of the plates, the cavity 27 presents the advantage of creating zones of weakness 28 on either side of the plates level with the end face 31B of the part 31, thereby making it easy for said plates to twist. In FIG. 2, dashed lines show the weak zones 29 of the plates after they have broken at the notches 26 during explosion of the fuse 24, with the portions of the plates that are connected to the part 31 thus tending to pivot about the weak zones 28 which then form fold lines for said plates 21 and 22.

In the application shown in FIG. 4, the parts define the outer shell of the top structure of a space launcher and they are composite, i.e. they comprise two strong cylindrical skins, namely an inner skin and an outer skin, both skins being based on carbon fibers for example, with a core being disposed between the skins, e.g. a honeycomb type core. This applies to the parts 2 and 3 and to the parts 30 and 31 shown in FIGS. 1 and 4 respectively.

It is thus particularly easy to engage the system 20 as shown in FIG. 4 in such composite parts by forming the recesses 30A and 31A in said parts during manufacture thereof. This is done by leaving gaps in the cores 30C and 31C of the parts 30 and 31 at their edges 30D and 31D, so that the cores do not reach the edges 30F and 31F that define the end faces 30B and 31B of the parts and of the said strong skins 30E and 31E.

Figure 5:
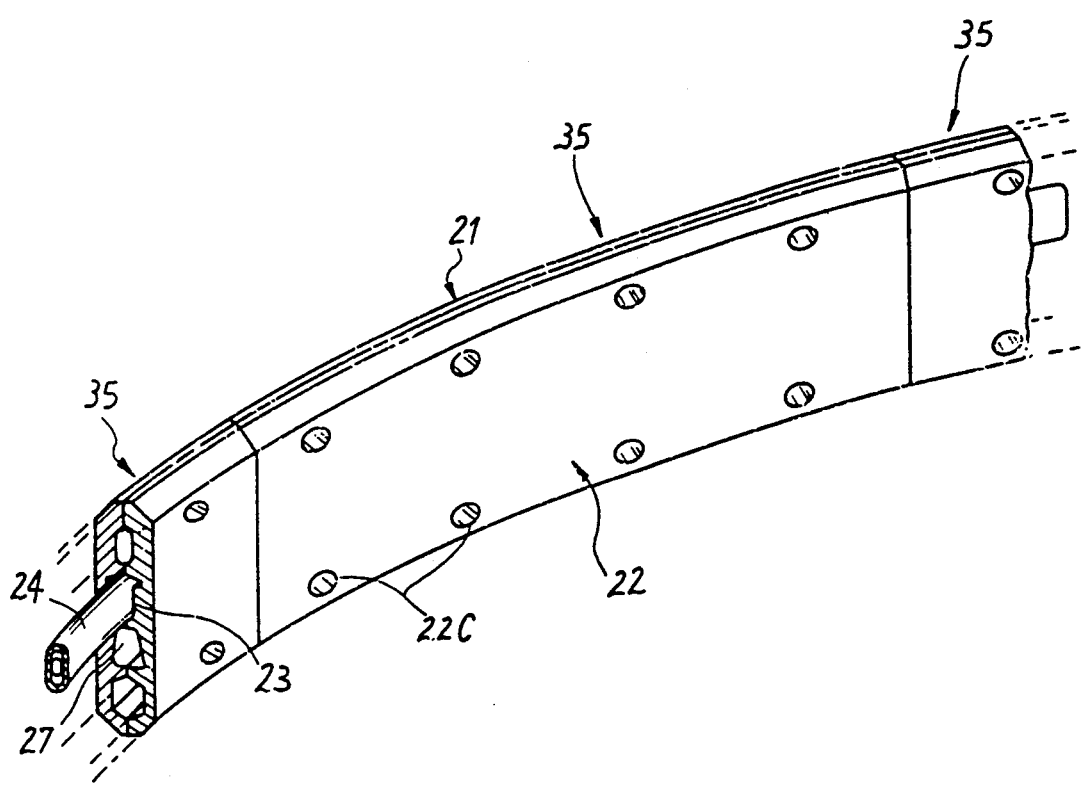
FIG. 5 is a fragmentary perspective view showing an embodiment of the system of the invention applied to separating two parts along a circular break line.

In the embodiment shown in part in FIG. 5, the system of the invention comprises a plurality of pairs of plates 35. Each pair 35 comprises an outer plate 21 and an inner plate 22 which are juxtaposed and which thus constitute a portion of a ring. On either side of the pair of plates 35 shown, there can be seen fragments of the adjacent pairs of plates which, in the assembled position, thus contribute to forming two juxtaposed rings of plates, an inner ring and an outer ring. However, in a variant embodiment, the pairs of plates could be spaced apart from one another.

I claim:

1. a breakable joint system for enabling parts to be separated, the system being of the type comprising two plates which mechanically interconnect said parts and which have an explosive charge disposed therebetween, wherein:

the two plates are juxtaposed against each other in a join plane, defining between them a housing for receiving said explosive charge;

the end faces of said parts have recesses in which the respective corresponding ends of said juxtaposed plates engage; and fixing means fix the ends of said plates in the recesses of said parts.

2. A system according to claim 1, in which said parts are of the composite type, comprising two strong skins with a core disposed therebetween, wherein the ends of said juxtaposed plates are engaged in recesses in said parts, said recesses being defined during manufacture of said parts by leaving gaps in the peripheral edge of said core, where they are set back relative to the respective peripheries of the strong skins.

3. A system according to claim 1, designed to separate two parts along a circular line, wherein the system comprises a plurality of pairs of plates each comprising a juxtaposed outer plate and inner plate, said pair of plates constituting a portion of a ring and said pairs of plates being disposed adjacent to one another.

4. A system according to claim 1 wherein the explosive charge is an explosive fuse cord.

5. A system according to claim 1 wherein the enabling parts to be separated are the top structures of a space vehicle.

6. A system according to claim 1, wherein said housing receiving the explosive charge is offset relative to the transverse midplane of said juxtaposed plates, thereby being close to one of said ends of said plates.

7. A system according to claim 6, wherein a cavity is also formed in said juxtaposed plates in the vicinity of said join plane, said cavity being disposed parallel to said housing for receiving the explosive charge so as to be close to the other of said ends of said plates.

8. A system according to claim 1, wherein notches, which open onto the housing, are provided in the walls of the plates that delimit the housing for receiving the explosive charge, thereby creating local zones of weakness in said plates.

9. A system according to claim 8, wherein said notches formed in the walls of the plates that delimit the housing for receiving said charge are disposed in the vicinity of said explosive charge in those portions of the walls that are furthest from the transverse midplane of the plates.

* * * * *